US 6,227,476 B1

United States Patent
Morisada

(10) Patent No.: US 6,227,476 B1
(45) Date of Patent: May 8, 2001

(54) TAKE-UP CONTROL DEVICE FOR LOADED TAPE CASETTE IN INFORMATION RECORDING/REPRODUCING APPARATUS

(75) Inventor: Katsuhiro Morisada, Osaka (JP)

(73) Assignee: Funai Electric Co., Ltd., Osaka (JP)

(*) Notice: Subject to any disclaimer, the term of this patent is extended or adjusted under 35 U.S.C. 154(b) by 0 days.

(21) Appl. No.: 09/378,304

(22) Filed: Aug. 20, 1999

(30) Foreign Application Priority Data

Sep. 1, 1998 (JP) .................................................. 10-006738

(51) Int. Cl.⁷ ............................. G11B 15/46; G11B 23/04
(52) U.S. Cl. ................... 242/334.4; 242/336; 360/73.01; 360/94
(58) Field of Search .............................. 242/334.3, 334.4, 242/334.1, 336, 357; 360/73.01, 94

(56) References Cited

FOREIGN PATENT DOCUMENTS 58-27592    6/1983   (JP) .

*Primary Examiner*—John Q. Nguyen
(74) *Attorney, Agent, or Firm*—Lackenbach Siegel Marzullo Aronson & Greenspan

(57) ABSTRACT

A take-up reel sensor measures a rotation cycle of a take-up reel of a loaded tape cassette in a take-up operation. A changing rate calculating section calculates a changing rate of the rotation cycle measured by the take-up reel sensor. A type discriminating section discriminates the tape cassette as a thick hub type or a thin hub type based on the rotation cycle measured by the take-up reel sensor, while it discriminates the tape cassette as the thin hub type or a VHS-C type based on the changing rate calculated by the changing rate calculating section. A system controller conducts a high speed take-up mode suitable for the type of the tape cassette discriminated by the type discriminating section. Accordingly, the take-up mode can be controlled by employing only the rotation cycle of the take-up reel.

9 Claims, 5 Drawing Sheets

TAKE-UP CONTROL DEVICE FOR LOADED TAPE CASETTE IN INFORMATION RECORDING/REPRODUCING APPARATUS

BACKGROUND OF THE INVENTION

The present invention relates to an information recording/reproducing apparatus having a high speed take-up mode in addition to a normal take-up mode, and more particularly to a take-up control device for a loaded tape cassette in the information recording/reproducing apparatus wherein a discrimination of a loaded tape cassette can be conducted by only one reel-cycle measurement circuit.

A recent type of take-up control device is provided with a high speed take-up mode in addition to a normal take-up mode in order to perform take up of the tape more speedy.

The high speed take-up mode is such a mode that a tape-up speed at a fast feeding time (FF time) and a rewinding time (REW time) can be varied in a plurality of steps according to a type of the tape cassette (i.e. a diameter of a reel hub). For example, a tape of 120 min can be wound up from the beginning to the end in about 1 minute.

There are a thick hub type of 62 mm and a thin hub type of 26 mm in diameter of the reel hub. Tapes of 30 min and 60 min are classified as the thick hub type, while tapes of 90 min and 120 min are classified as the thin hub type.

In the high speed take-up mode, the method of controlling the take-up speed varies depending on a difference between the diameters of the hubs (the thick hub type and the thin hub type). Therefore, it is necessary to discriminate the diameter of the reel hub, at a moment when the tape cassette is loaded in the apparatus and the first take-up mode is carried out.

Conventionally, the discrimination of the reel hub has been conducted on the basis of a calculated value A in the following calculation formula (1):

$$(4Tt)^2 + (4Ts)^2 = A \text{(a constant value)} \quad (1)$$

In the formula, Tt is a reel pulse cycle of a take-up reel, and Ts is a reel pulse cycle of a supply reel.

In the above formula (1), each of the reel pulse cycles Tt and Ts is multiplied by 4. This is because 4 pulses of reel pulses are output on each one rotation of the reel. By multiplying each reel pulse by 4, a cycle of one rotation of the supply reel and a cycle of one rotation of the take-up reel can be obtained. Therefore, the formula (1) is a calculation formula for obtaining a sum of a square of the one rotation of the supply reel and a square of the one rotation of the take-up reel.

The value A is a proper value to be determined by the type of the tape cassette (the thick hub type and the thin hub type), and the tape cassette can be discriminated whether it is of the thick hub type or the thin hub type by means of the value A.

In the meantime, after the discrimination of the reel hub diameter is finished, a switching control of the tape speed in the take-up mode must be conducted in such a speed mode as corresponding to the discriminated reel hub diameter.

The switching of the tape speed in the take-up mode will be conducted by estimating an amount of the tape remaining in the supply reel (or the take-up reel). As one of methods for estimating the remaining amount of the tape, a ratio between the reel pulse cycle Ts of the supply reel and the reel pulse cycle Tt of the take-up reel (the following formulae (2) and (3)) is employed to determine a value N, and the tape speed will be changed by means of the value N.

$$N = Tt/Ts \text{(FF mode)} \quad (2)$$

$$N = Ts/Tt \text{(REW mode)} \quad (3)$$

As another method for estimating the remaining amount of the tape, as is disclosed in Japanese Patent Publication No. 58-27592B, number of remaining turns in the tape and remaining time can be calculated from a thickness of the tape, a diameter of the reel, reproduction speed of the tape and a rotation cycle of the reel.

As described, the related take-up control device is so constructed that the speed is controlled by estimating the remaining amount of the tape employing the reel pulse cycle Tt of the take-up reel and the reel pulse cycle Ts of the supply reel. The conventional device has a drawback that it requires a number of components and a complicated circuit structure, because two circuits are necessary for measuring the reel cycles respectively for the take-up reel and the supply reel.

SUMMARY OF THE INVENTION

The present invention has been made in order to overcome the above mentioned problem, and it is an object of the invention to provide a take-up control device for a tape cassette in an information recording/reproducing apparatus which allows the loaded tape cassette to be discriminated by means of a single reel-cycle measurement circuit.

In order to achive the above object, there is provided a take-up control device for a loaded tape cassette in an information recording/reproducing apparatus having a high speed take-up mode in addition to a normal take-up mode, comprising: means for measuring a rotation cycle of a reel acting as a supplying side of the tape cassette; means for calculating a changing rate of the rotation cycle measured by the measuring means; first discriminating means for discriminating whether the tape cassette is of a thick hub type or a thin hub type on the basis of the rotation cycle measured by the measuring means, and for discriminating, when the tape cassette has been discriminated as the thin hub type, whether the tape cassette is of the thin hub type or out of standard, on the basis of the changing rate calculated by the calculating means; and means for conducting a high speed take-up mode suitable for the type of the loaded tape cassette discriminated by the first discriminating means. Therefore, the tape cassette can be discriminated by means of the rotation cycle of the reel acting as the supplying side only, and requires only one circuit for measuring the rotation cycle. The number of the components can be thus decreased, whereby the products can be supplied at a low cost.

In the device, the first discriminating means discriminates the tape cassette as the thin hub type when the measured rotation cycle is longer than a predetermined first standard cycle, while as the thick hub type when it is at or shorter than the first standard cycle, and discriminates the loaded tape cassette as the thin hub type when the calculated changing rate is above a predetermined standard rate, while as out of the standard when it is at or below the standard rate. By introducing the new concept of the changing rate, the tape cassette can be discriminated by means of the rotation cycle of the reel acting as the supplying side only.

In the device, in case where the loaded tape cassette has been discriminated as the thin hub type by the first discriminating means, the high speed take-up conducting means shifts the high speed take-up mode to the normal take-up mode at least one of when the measured rotation cycle has become at or below a predetermined second standard cycle shorter than the first standard cycle, or when the calculated changing rate has become at or below the standard rate. In this way, even though the high speed take-up mode is conducted, the winding speed of the tape of the thin hub type or out of the standard can be reliably decreased just before completion of the rewinding.

The device further comprises: means for accumulating a recording time or a reproducing time since the tape cassette has been loaded; and second discriminating means for discriminating that the loaded tape cassette is of the thin hub type, when the time accumulated by the accumulating means is above the time capable of recording or reproducing in the tape cassette of the thick hub type. Since there is provided means for discriminating only the thin hub type apart from the means for discriminating the type of tape cassette, the thin hub type can be reliably discriminated from the tape out of the standard. Further, in case where the loaded tape cassette has been already discriminated as the thin hub type by the second discriminating means, no further discrimination by the first discriminating means will be necessary. The discrimination process can be thus simplified.

In the device, the tape cassette out of the standard includes a VHS-C tape cassette. Therefore, the VHS-C tape cassette can be reliably discriminated.

DETAILED DESCRIPTION OF THE PREFERRED EMBODIMENTS

Now the present invention will be described in detail by way of example referring to the accompanying drawings.

Figure 1:
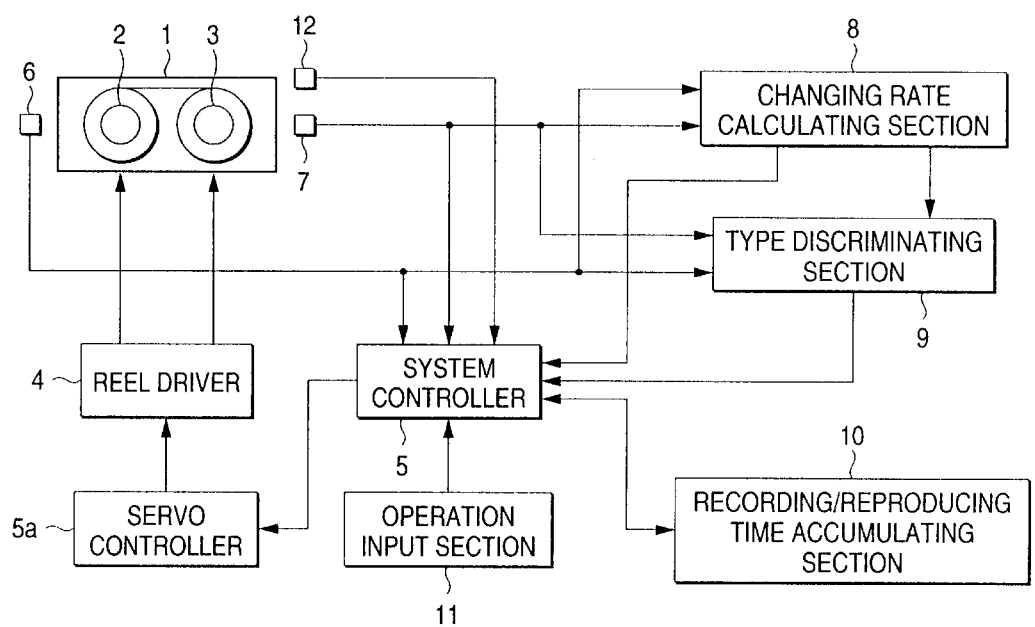
FIG. 1 is a block diagram showing the essential section of an information recording/reproducing apparatus equipped with a take-up control device for a tape cassette according to the present invention.

FIG. 1 is a block diagram showing a configuration of the essential section of an information recording/reproducing apparatus which is equipped with a take-up control device for a tape cassette according to the present invention.

In the drawing, numeral 1 designates a tape cassette loaded in an apparatus body which is not shown. Rotation movement of a supply reel 2 and a take-up reel 3 in the tape cassette 1 is controlled by a reel driver 4 according to each operation mode, such as recording, reproducing, fast feeding (FF), rewinding (REW), etc. The reel driving means 4 are controlled by a servo controller 5a connected to a system controller 5.

The apparatus body 1 further includes a supply reel sensor 6 for detecting a rotation speed (reel cycle) of the supply reel 2 of the loaded tape cassette 1, a take-up reel sensor 7 for detecting a rotation speed (reel cycle) of the take-up reel 3, and a cassette detecting sensor (micro switch or the like) 12 for detecting the tape cassette 1 loaded inside the apparatus body.

An output of the supply reel sensor 6 and an output of the take-up reel sensor 7 are respectively introduced to the system controller 5, a changing rate calculating section 8 for calculating a changing rate in the detected reel cycle, and a type discriminating section 9 for discriminating the type of the loaded tape cassette 1. An output of the changing rate calculating section 8 is introduced to the type discriminating section 9. Further, the output of the changing rate calculating section 8 and an output of the type discriminating section 9 are introduced to the system controller 5.

To the system controller 5 are connected reciprocally a recording/reproducing time accumulating section 10 for accumulating a recording time and a reproducing time since the tape cassette 1 has been loaded, as well as an operation input section 11 including various operating buttons, such as a recording button, a reproducing button, a fast feeding (FF) button, a rewinding (REW) button, a stop button, etc.

The changing rate calculating section 8 calculates the changing rate $\alpha$ in the reel cycles measured by means of the supply reel sensor 6 or the take-up reel sensor 7. The changing rate $\alpha$ is a ratio between a present reel cycle and a reel cycle before a certain time (for example, 10 seconds), and shown in the following formula (4):

$$\alpha = \text{(the present reel cycle)}/\text{(the reel cycle before a certain time)} \quad (4)$$

The type discriminating section 9 discriminates whether the loaded tape cassette 1 is of the thick hub type or the thin hub type on the basis of the reel cycle measured by the supply reel sensor 6 or the take-up reel sensor 7. In case where the tape cassette 1 is discriminated as the thin hub type, it further discriminates, on the base of the changing rate calculated in the changing rate calculating section 8, whether the tape cassette is of the thin hub type or out of standard (a VHS-C tape cassette, in this embodiment).

In other words, the type discriminating section 9 discriminates the tape cassette 1 as the thin hub type in case where the measured reel cycle is longer than a predetermined first standard cycle, and discriminates it as the thick hub type in case where the measured reel cycle is shorter than the predetermined first standard cycle. If the calculated changing rate $\alpha$ is above a predetermined standard changing rate, the tape cassette is discriminated as the thin hub type, and if the changing rate $\alpha$ is at or below the standard changing rate, the tape cassette is discriminated as the VHS-C tape cassette.

Now, how the first standard cycle and the standard changing rate are determined will be explained hereunder.

Figure 2:
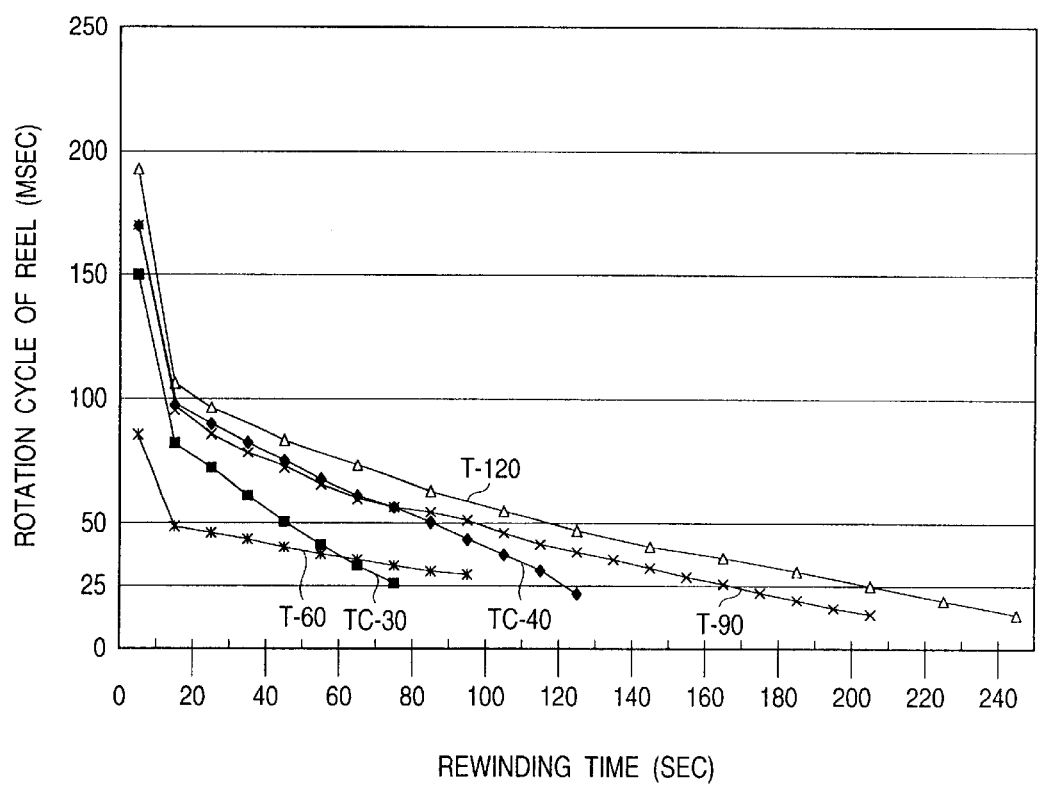
FIG. 2 shows a relationship between rewinding times and reel cycles of various types of tape cassettes.

FIG. 2 is shows a relationship between rewinding times and the reel cycles of the tape cassettes of various types. The graph was obtained from experiments. For information, this graph shows a case where the tape is rewound at 30 times speed (that is, a speed at which a tape of 120 min is rewound in 4 minutes).

It is noted from the graph in FIG. 2 that the tape cassette T-60 of the thick hub type has the reel cycle below 50 ms from the beginning of the rewinding. On the other hand, the tape cassettes of the thin hub type such as T-90 and T-120 have large reel cycles of 95 to 105 ms at the start of the rewinding, and thereafter, the reel cycles gradually decrease substantially linearly to 60 ms, when about 60 sec have passed from the start of the rewinding. From this results, in this embodiment, 60 ms is selected as a level (the first standard cycle) for discriminating the thick hub type T-60 from the thin hub type T-90 and T-120. In the meantime, the VHS-C tape cassettes TC-30 and TC-40 which belong to the thick hub type have the reel cycles of 80 to 95 ms at the start of the rewinding, but thereafter, their reel cycles rapidly decrease. In about 30 sec from the start of the rewinding in case of the VHS-C tape cassette TC-30, and in about 50 sec in case of the VHS-C tape cassette TC-40, both the reel cycles have decreased to 60 ms. For this reason, if the first standard cycle is set to be 60 ms, there is a fear that the VHS-C tape cassette may not be discriminated as the thick hub type, but discriminated as the thin hub type instead. Therefore, in this invention, there is employed a concept of the changing rate in the reel cycle in order to discriminate the thin hub type from the VHS-C tape cassette.

Figure 3:
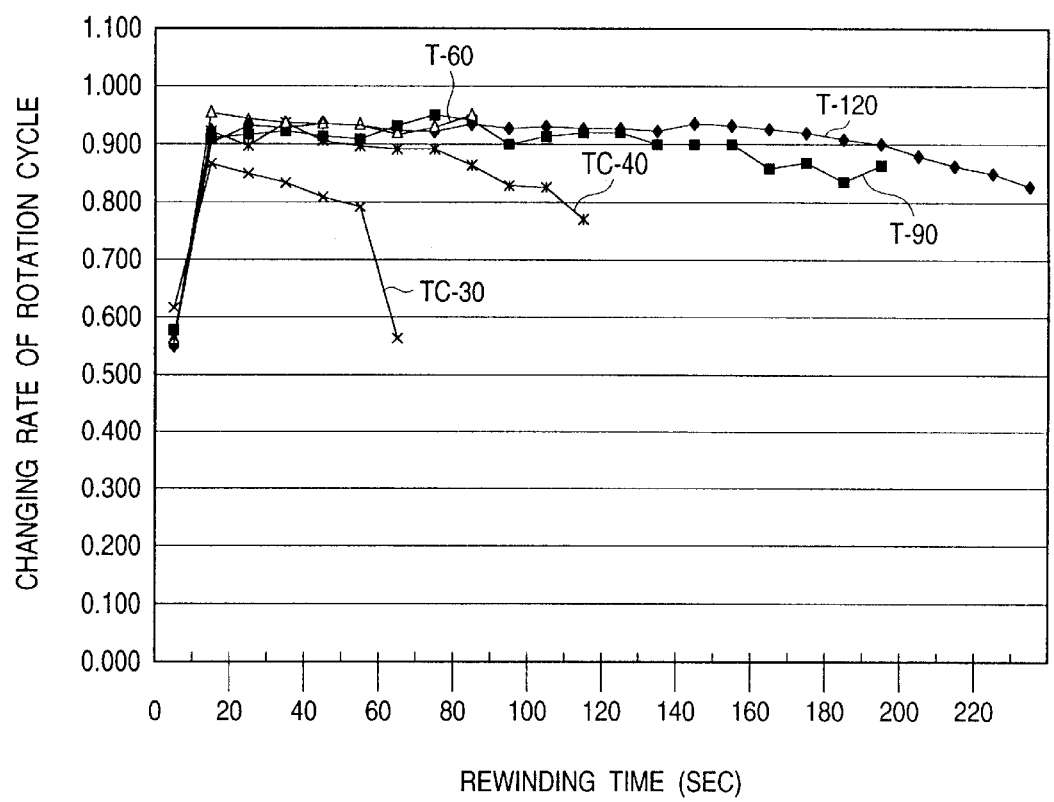
FIG. 3 shows a relationship between the rewinding times and changing rates in the reel cycles of the various types of the tape cassettes.

FIG. 3 is shows a relationship between the rewinding times and the changing rates in the reel cycles of the tape cassettes of various types. The graph was also obtained from experiments. For information, this graph too shows a case where the tape is rewound at the speed multiplied by 30 (that is, the speed at which the tape of 120 min is rewound in 4 minutes).

It is noted from the graph in FIG. 3 that the tape cassettes of the thin hub type such as T-90 and T-120 have the changing rate α of more than 0.900 at the initiation of the rewinding, and thereafter maintain the changing rate of a little larger than 0.900 without a substantial change. The changing rate of the tape cassette T-90 decreases below 0.900 after 160 sec since the start of the rewinding, and that of the tape cassette T-120 decreases below 0.900 after about 200 sec since the start of the rewinding. Then, the changing rate in both the tape cassettes decreases to about 0.820 when the rewinding is finished.

On the other hand, in the VHS-C tape cassette TC-30, the changing rate is already below 0.900 (about 0.870) at the start of the rewinding. It rapidly decreases from this point until it reaches 0.800 after 50 sec have passed since the start of the rewinding. As described, there is a big difference in the changing rate between the tape cassette of the thin hub type such as T-90 and T-120 and the VHS-C tape cassette TC-30. From these results, in this embodiment, 0.900 is selected as a level (the standard changing rate) for discriminating the tape cassettes of the thin hub type such as T-90 and T-120 from the VHS-C tape cassette TC-30. As for the VHS-C tape cassette TC-40, the changing rate α at the start of the rewinding is more than 0.900, and so, the VHS-C tape cassette TC-40 cannot be discriminated if the standard changing rate is set to be 0.900. Accordingly, such VHS-C tape cassette TC-40 as unable to discriminate must be treated by separately setting a timing for shifting from the high speed take-up mode to the normal take-up mode in the take-up mode control. This will be described later.

From the foregoing results, the type discriminating section 9 discriminates the loaded tape cassette in the following manner: At the start of the rewinding motion, the reel cycle is measured at REW4 mode (30 times speed), and on the basis of the measured value, whether the tape cassette is of the thin hub type or the thick hub type is discriminated in the following two cases:

(Discrimination 1) When the reel cycle is 60 ms or less, the tape cassette is discriminated as the thick hub type.

(Discrimination 2) When the reel cycle is more than 60 ms, the tape cassette is discriminated as the thin hub type (or the VHS-C tape cassette).

In case where the tape cassette has been discriminated as the thin hub type in the discrimination 2, whether it is of the thin hub type or the VHS-C tape cassette will be discriminated in the following two cases:

(Discrimination 3) If the changing rate α is 0.900 or less, the tape cassette is discriminated as the VHS-C tape cassette.

(Discrimination 4) If the changing rate α is more than 0.900, the tape cassette is discriminated as the thin hub type.

The recording/reproducing time accumulating section 10 accumulates the recording time or the reproducing time since the loading time of the tape cassette 1 through the control from the system controller 5. In this case, when the FF/REW operations are effected during the reproduction, the time will be corrected by means of a control signal. An accumulated time is, as a rule, the recording/reproducing time in an SP (normal) mode, and when the recording or the reproduction is carried out in an EP (3 times recording time) mode, the time must be converted to the SP mode. The system controller 5 is always monitoring the accumulated time in the recording/reproducing time accumulating section 10. When the accumulated time has become, for example, 65 minutes (that is, sufficiently over the accumulated time of the tape cassette T-60 of the thick hub type), the recording/reproducing time accumulating section 10 will be reset, and the loaded tape cassette will be discriminated as the thin hub type. Once it has been discriminated as the thin hub type, the recording/reproducing time accumulating section 10 will conduct no further accumulation.

When the rewinding (REW) button in the operation input section 11 is operated, the system controller 5 carries out the high speed rewinding mode according to the type of the loaded tape cassette, on the basis of the result of the discrimination in the type discriminating section 8 and the result of the discrimination depending on the accumulated time in the recording/reproducing time accumulating section 10. Further, in case where the loaded tape cassette 1 has been discriminated as the thin hub type or the thick hub type by the type discriminating section 9, the system controller 5 will shift the high speed take-up mode to the normal take-up mode, when the reel cycle measured by the supply reel sensor 6 becomes at or below a second standard cycle (described herein later) which is shorter than the first standard cycle (60 ms). In case where the loaded tape cassette has been discriminated as the thin hub type by the type discriminating section 9, the system controller 5 will shift the high speed take-up mode to the normal take-up mode, when the changing rate α of the reel cycle calculated by the changing rate calculating section 8 becomes at or below the standard changing rate (0.900).

Now, referring to the above explained graph in FIG. 2, a manner in which the second standard cycle is set will be explained in detail.

From the graph shown in FIG. 2, it is noted that the reel cycles of the thin hub type tape cassettes such as T-90 and T-120 become below 25 ms at about 20 seconds before completion of the rewinding. Therefore, in the present invention, the reel cycle of 25 ms is selected as a speed reduction point (the second standard cycle) at which the tape cassette of the thin hub type is shifted from the high speed winding (for example, rewinding) to the normal winding (for example, rewinding) mode.

From the graph shown in FIG. 3, it is noted that the VHS-C tape cassette TC-40 particularly has the changing rate α of over 0.900 at the start of the rewinding. Therefore, in this stage, the VHS-C tape cassette TC-40 is also discriminated as the thin hub type and the take-up mode for the thin hub type will be conducted. Accordingly, the VHS-C tape cassette TC-40 must be immediately shifted from the high speed take-up (rewinding) mode to the normal take-up (rewinding) mode. Referring to the graph shown in FIG. 3, in the VHS-C tape cassette TC-40, the changing rate α which has been over 0.900 at the start of the rewinding becomes below 0.900 after a short time, and then gradually decreases until the rewinding is finished. Therefore, in the present invention, the standard changing rate (0.900) is selected as the speed reduction point so as to shift the VHS-C tape cassette such as TC-40 from the high speed take-up (rewinding) mode to the normal take-up (rewinding) mode.

In other words, the high speed take-up conducting means and the second discriminating means of the present invention are realized by means of the system controller 5 in the present embodiment.

Figure 4:
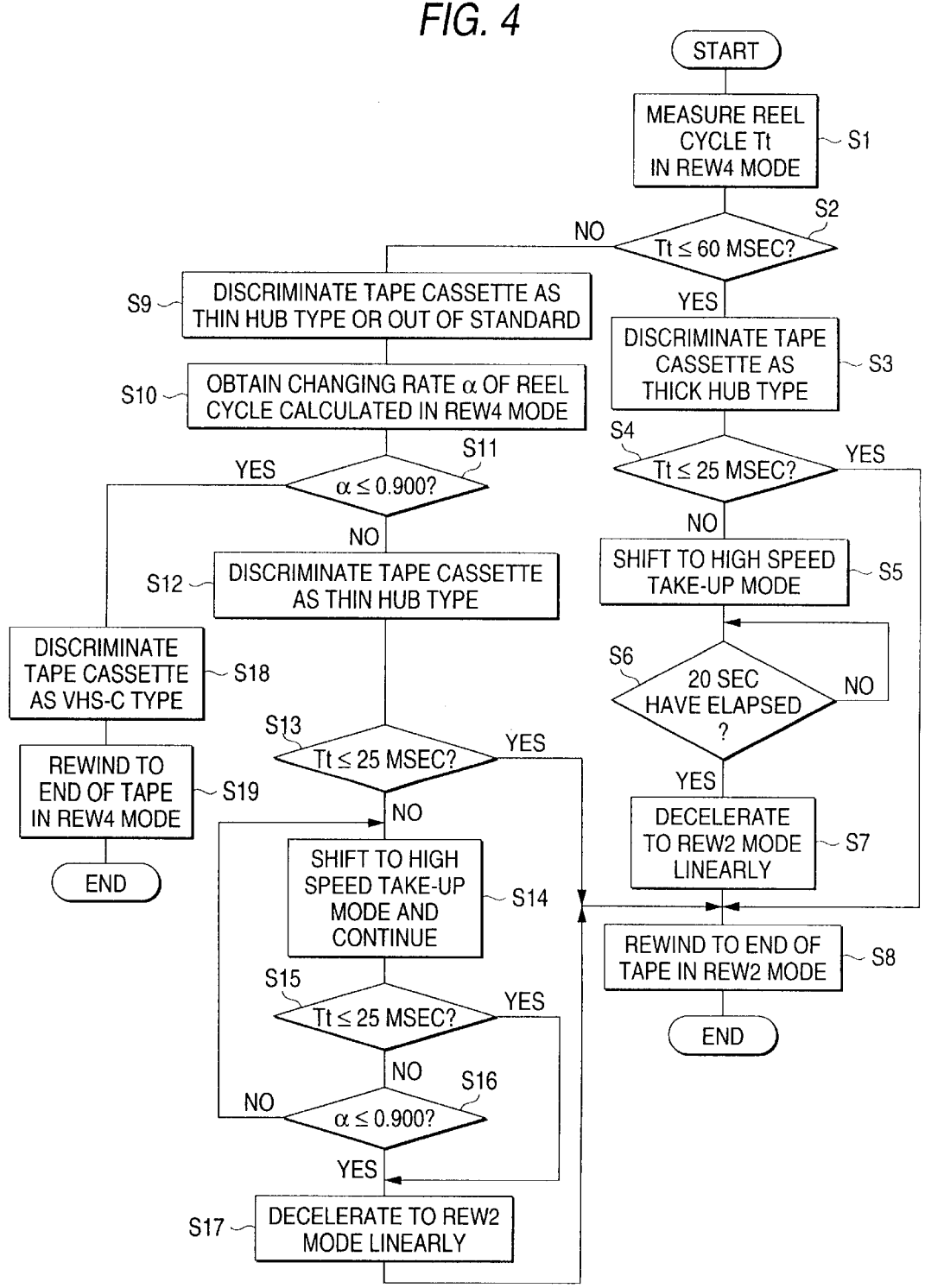
FIG. 4 is a flow chart for explaining operations in a take-up mode (rewinding mode) of the take-up control device.
Figure 5:
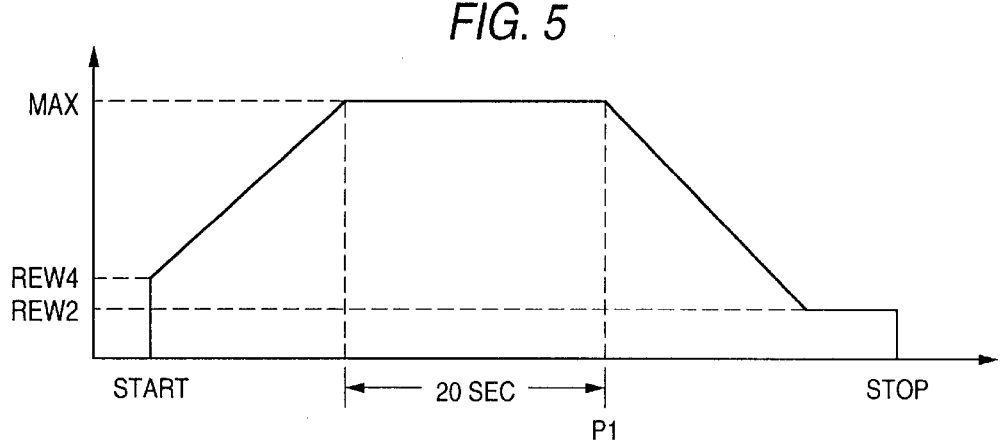
FIG. 5 is a schematic diagram of a speed change in the rewinding mode of a thick hub type.
Figure 6:
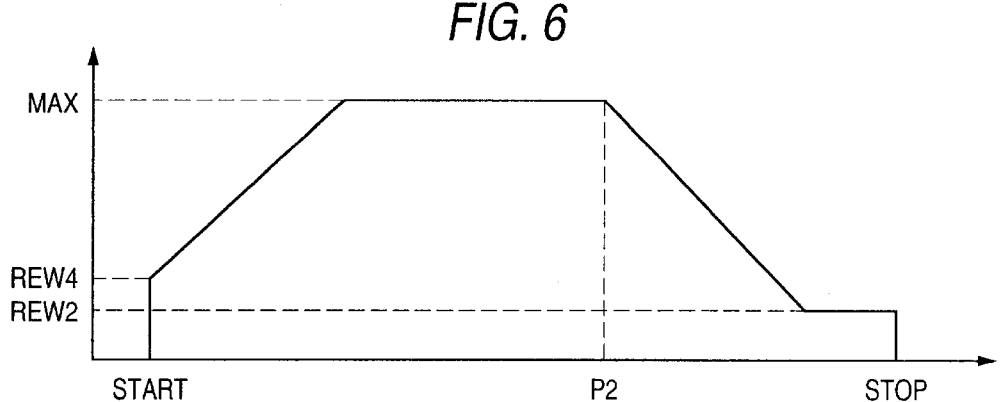
FIG. 6 is a schematic diagram of a speed change in the rewinding mode of a thin hub type.
Figure 7:
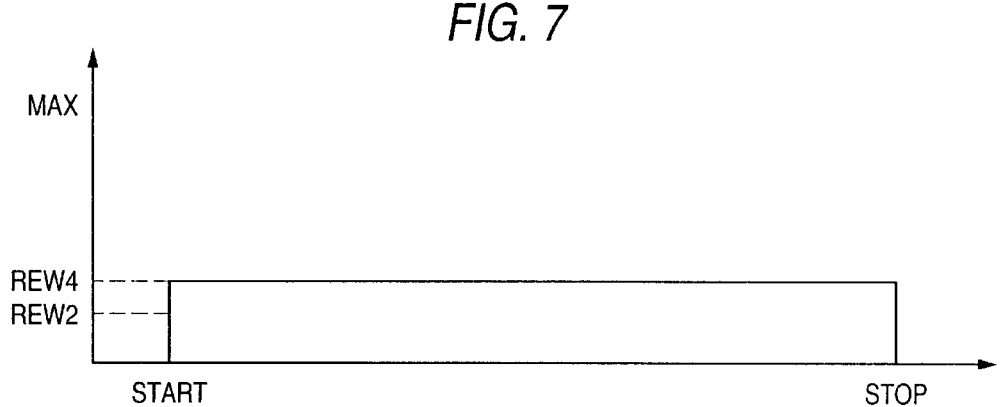
FIG. 7 is a schematic diagram of a speed change in the rewinding mode of a VHS-C cassette.

Referring now to a flow chart as shown in FIG. 4 and image drawings illustrating speed changes in the rewinding mode as shown in FIGS. 5 to 7, operations in the take-up mode (especially rewinding mode) in the take-up control device of the above described structure will be explained. For information, what is meant by "a reel acting as a supplying side" of the present invention is, in the rewinding mode, the take-up reel 3 from which the tape is drawn out, while in the fast feeding mode, is the supply reel 2 from which the tape is drawn out. Here, the operations in the rewinding mode will be explained, and "the reel acting as the supplying side" described in the above is the take-up reel 3, and the reel-cycle measuring means in this case is the take-up reel sensor 7. The following description of the operations will be made according to these definitions.

When a user operates the rewinding (REW) button in the operation input section 11, under a condition that the desired tape cassette 1 is loaded in the apparatus body, the system controller 5 receives this operation signal to conduct the REW motion. At the start of the REW motion, the take-up reel sensor 7 detects the rotation speed of the take-up reel 3 at the winding speed in REW4 mode (the 30 times speed) thereby to measure the reel cycle (step S1). Then, whether or not the measured value (the reel cycle) is 60 ms or less is discriminated here (step S2). In case where the reel cycle is 60 ms or less, the tape cassette is discriminated as the thick hub type (step S3). On the other hand, in case where the reel cycle is more than 60 ms, it is discriminated as the thin hub type or the VHS-C tape cassette (step S9).

The tape cassette which has been discriminated here as the thick hub type is then subjected to discrimination as to whether or not the reel cycle is 25 ms or less (step S4). In short, whether the remaining amount of the tape is small or not is judged. When the reel cycle is 25 ms or less, the tape is judged as a tape having a small remaining amount, and reducing the speed from REW4 mode to REW2 mode (for example, 20 times speed), the tape will be rewound to the end at REW2 mode (step S8).

In case where the reel cycle is more than 25 ms in the discrimination in the step S4, rewinding speed control operations of the thick hub type in the steps S5 to S8 (the rewinding speed control as shown in FIG. 5) will be conducted. The take-up mode will be shifted from the current REW4 mode to the high speed take-up mode MAX (for example, 120–130 times speed). On this occasion, the system controller 5 starts counting of 20 seconds by means of a timer (not shown) provided internally (step S6). In other words, the high speed take-up mode MAX will follow for 20 seconds. After 20 seconds (at a point P1 in FIG. 5), the remaining amount of the tape to be rewound is judged to be small, and the speed will be linearly reduced to REW2 mode (step S7), at which the tape will be rewound to the end (step S8).

On the other hand, in case where the tape cassette has been discriminated as the thin hub type or the VHS-C tape cassette in the step S9, the system controller 5 obtains the changing rate α of the reel cycle calculated in the changing rate calculating section 8 (step S10), and discriminates whether or not the changing rate is 0.900 or less (step S11). If the changing rate α is more than 0.900, the tape cassette is discriminated as the thin hub type (step 12). If the changing rate α is 0.900 or less, it is discriminated as the VHS-C tape cassette (step S18).

After the tape cassette has been discriminated as the thin hub type in the step 12, whether or not the reel cycle is 25 ms or less is discriminated (step S13). In short, whether the remaining amount of the tape is small or not is discriminated. In case where the reel cycle is 25 ms or less, the tape is discriminated as having a small remaining amount and the speed will be reduced from REW4 mode to REW2 mode (for example, 20 times speed), at which the tape will be rewound to the end (step S8).

On the other hand, if the reel cycle is more than 25 ms, in the discrimination in the step S13, rewinding speed control for the thin hub type (the rewinding speed control as shown in FIG. 6) according to steps S14 through S17 and the step S8 is conducted. In short, the speed is shifted from the current mode REW4 to the high speed take-up (rewinding) mode MAX (for example, 120–130 times speed). In this high speed take-up (rewinding) mode, whether or not the reel cycle has become 25 ms or less (step S15) or whether or not the changing rate α has become 0.900 or less (step S16) will be discriminated.

Because the tape cassettes which has been discriminated as the thin hub type sometimes include the VHS-C tape cassette such as TC-40, the discrimination in the step S16 is added in order to rapidly discriminate whether it is the VHS-C tape cassette or not. Until the answer is YES in the step S15 or S16, the high speed take-up (rewinding) mode at MAX (for example, 120–130 times speed) will be continued. When the answer is YES in the step S15 or S16 (at a point P2 in FIG. 6), the tape is discriminated as having a small remaining amount, and the speed will be reduced to REW2 mode (step S17), at which the tape will be rewound to the end (step S8). It is to be noted that the discrimination standard 25 ms in the step S15 is the value at REW4 mode (30 times speed). Therefore, in case where the high speed take-up (rewinding) mode MAX is 120 times speed, a quarter of the value, namely 6.25 ms is the true discrimination standard value.

In the meantime, in case where the tape cassette has been discriminated as the VHS-C tape cassette in the step S18, the tape will be rewound to the end maintaining the mode REW4 (step S19).

Apart from the processes in the steps S2 and S11 for discriminating the type of the loaded tape cassette 1, the system controller 5 carries out the discrimination process that the loaded tape cassette 1 is of the thin hub type in case where the recording or the reproducing time accumulated in the recording/reproducing time accumulating section 10 is more than 65 minutes. For this reason, the processes in the steps S2 and S11 will be omitted, when the tape cassette has been already discriminated as the thin hub type based on the accumulated time. In this case, the processes only after the step S13 will be conducted as the operation of the take-up mode (rewinding mode) of the take-up control device.

By conducting the described take-up speed control, it is possible to take up the tape in about 60 sec at maximum, even if any type of the tape cassette is loaded.

In the described embodiment, the first standard cycle is set to be 60 ms, the second standard cycle is set to be 25 ms and the standard changing rate is set to be 0.900, which, however, are not necessarily restricted to the values. For example, from the graph as shown in FIG. 2, the first standard cycle can be a desired value within a scope of 50 to 60 ms, the second standard cycle can be a desired value within a scope of 20 to 35 ms, and the standard changing rate can be a desired value within a scope of 0.800 to 0.900.

Further, in the above described embodiment, the rewinding speed control system for the tape cassette of the thick hub type is so constructed that after the high speed take-up (rewinding) mode has been conducted for 20 seconds, the linear reduction of the speed is effected until REW2 mode. Also in this case, the time is not necessarily restricted to the fixed time of 20 seconds, but it is possible to effect the linear reduction of the speed until REW2 mode, when the reel cycle has reached the fixed value or less (for example, 40 ms or less based on the test result as shown in FIG. 2).

Because the above described values have been obtained from the graphs in FIGS. 2 and 3 showing the test results, the values may naturally change when the type or capacity of a video cassette recorder has changed. Therefore, the optimum values may be set according to the various types as well as the various capacities.

Although only the rewinding mode has been explained in the above described embodiment, it is a matter of course that the present invention can be applied also to the fast feeding mode. In such case, "the reel acting as the supplying side" of the present invention is the supply reel 2, and the reel-cycle measuring means are the reel sensor 6.

Although only the video tape recorder has been explained as the information recording/reproducing apparatus, it is a matter of course that the present invention can be applied also to any type of a magnetic recording/reproducing apparatus.

What is claimed is:

1. A take-up control device for a loaded tape cassette in an information recording/reproducing apparatus having a high speed take-up mode in addition to a normal take-up mode, comprising:

means for measuring a rotation cycle of a reel acting as a supplying side of the tape cassette;

means for calculating a changing rate of the rotation cycle measured by the measuring means;

first discriminating means for discriminating whether the tape cassette is of a thick hub type or a thin hub type on the basis of the rotation cycle measured by the measuring means, and for discriminating, when the tape cassette has been discriminated as the thin hub type, whether the tape cassette is of the thin hub type or out of standard, on the basis of the changing rate calculated by the calculating means; and means for conducting a high speed take-up mode suitable for the type of the loaded tape cassette discriminated by the first discriminating means.

2. The take-up control device as set forth in claim 1, wherein the first discriminating means discriminates the tape cassette as the thin hub type when the measured rotation cycle is longer than a predetermined first standard cycle, while as the thick hub type when the measured rotation cycle is at or shorter than the first standard cycle, and discriminates the loaded tape cassette as the thin hub type when the calculated changing rate is above a predetermined standard rate, while as out of the standard when the calculated changing rate is at or below the standard rate.

3. The take-up control device as set forth in claim 2, wherein in case where the loaded tape cassette has been discriminated as the thin hub type by the first discriminating means, the high speed take-up conducting means shifts the high speed take-up mode to the normal take-up mode at least one of when the measured rotation cycle has become at or below a predetermined second standard cycle shorter than the first standard cycle, and when the calculated changing rate has become at or below the standard rate.

4. The take-up control device as set forth in claim 1, further comprising:

means for accumulating a recording time or a reproducing time since the tape cassette has been loaded; and second discriminating means for discriminating that the loaded tape cassette is of the thin hub type, when the time accumulated by the accumulating means is above the time capable of recording or reproducing in the tape cassette of the thick hub type.

5. The take-up control device as set forth in claim 1, wherein the tape cassette out of the standard includes a VHS-C tape cassette.

6. A method of controlling take-up modes for a loaded tape cassette in an information recording/reproducing apparatus having a high speed take-up mode in addition to a normal take-up mode, comprising the steps of:

measuring a rotation cycle of a reel acting as a supplying side of the tape cassette;

calculating a changing rate in the measured rotation cycle;

judging whether the measured rotation cycle is longer than a predetermined first standard cycle;

discriminating the tape cassette as a thin hub type if the rotation cycle is longer than the first standard cycle, while discriminating as a thick hub type if the rotation cycle is at or shorter than the first standard cycle;

judging whether the calculated changing rate is above a predetermined standard rate;

discriminating the tape cassette as the thin hub type if the changing rate is above the standard rate, while discriminating as out of standard if the changing rate is at or below the standard rate;

conducting a high speed take-up mode suitable for the discriminated type of the tape cassette.

7. The take-up mode controlling method as set forth in claim 6, wherein in case where the loaded tape cassette has been discriminated as the thin hub type, the high speed take-up mode is shifted to the normal take-up mode at least one of when the measured rotation cycle has become at or below a predetermined second standard cycle shorter than the first standard cycle, and when the calculated changing rate has become at or below the standard rate.

8. The take-up mode controlling method as set forth in claim 6, further comprising the steps of:

accumulating a recording time or a reproducing time since the tape cassette has been loaded;

discriminating the tape cassette as the thin hub type if the accumulated time is longer than a time capable of recording or reproducing in the tape cassette of the thick hub type.

9. The take-up mode controlling method as set forth in claim 6, wherein the tape cassette out of the standard includes a VHS-C tape cassette.

* * * * *